Patented Feb. 16, 1932

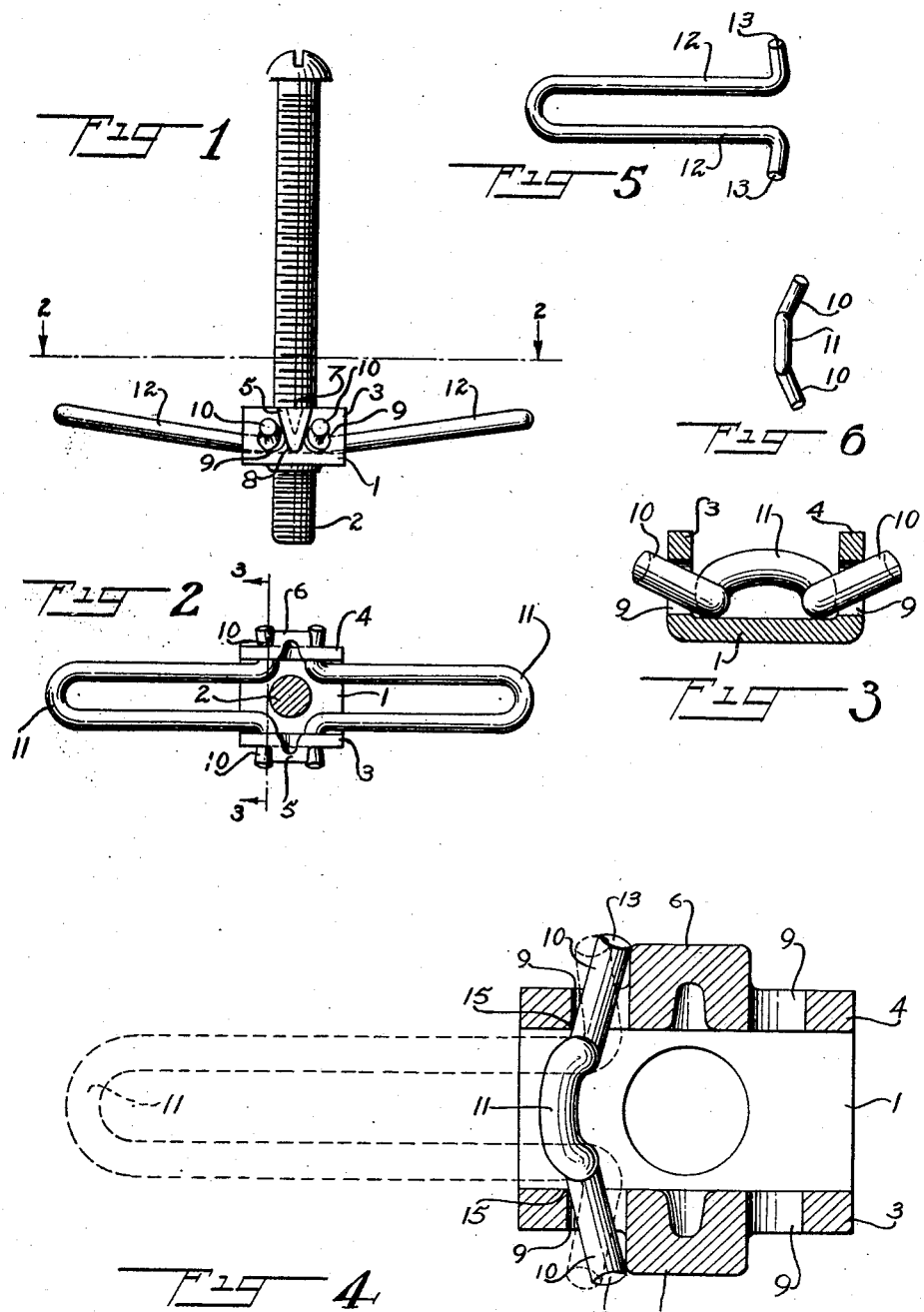

1,845,283

UNITED STATES PATENT OFFICE

JOHN KARITZKY, OF GARWOOD, NEW JERSEY, ASSIGNOR TO HENRY B. NEWHALL CORPORATION, OF GARWOOD, NEW JERSEY, A CORPORATION OF NEW JERSEY

TORTIONAL SPRING TOGGLE

Application filed October 11, 1929. Serial No. 398,897.

My invention relates to toggle bolts, which are well known in the trade, and more particularly to a tortional spring toggle bolt wherein the spring of the toggle is obtained by subjecting the arms to tortional strains when they are bent back 90° to permit their insertion in the hole of the support.

My invention further relates to certain combinations, sub-combinations, articles of manufacture and details of construction, all of which will be more fully hereinafter described and pointed out in the claims.

In the figures I have shown one embodiment of my invention, the same reference numerals refer to similar parts of the several figures.

Fig. 1 is a side elevation, with the spring arms in their normal extended position;

Fig. 2 is a vertical section on line 2—2 of Fig. 1, looking down in the direction of the arrows;

Fig. 3 is an enlarged detail fragmentary sectional view on line 3—3 of Fig. 2;

Fig. 4 is an enlarged sectional view on a horizontal plane taken through the pivot holes in the nut;

Fig. 5 is a front elevation of one of the spring arms;

Fig. 6 is a plan view looking down on one of the spring arms illustrating the angle of the fingers.

In the embodiment of my invention illustrated in the drawings 1 is a nut preferably though not necessarily formed from stamped sheet metal and provided with female screw threads to cooperate with the threads upon the stove or other bolt 2. It is also provided with two flanges 3 and 4 each flange being preferably provided with stops 5 and 6, preferably by pressing out the sheet metal. For reasons to be hereinafter described these stops preferably taper, being widest at 7 and narrowest at 8.

Each flange is provided with two enlarged bearings 9—9 for the reception of the fingers 10—10 of the spring arms 11—11, the two bearings in each flange adapted to receive fingers 10 of different spring arms 11, Figs. 1 and 2.

These spring arms are preferably formed of spring wire bent back on itself, the ends being bent out and up at an angle to the legs 12—12 forming the fingers 10—10, one on each leg 12.

The two fingers 10—10 of each spring arm are mounted in the enlarged bearings 9—9 in the flanges 3 and 4 of the nut as shown. Normally the arms rest in their extended position shown in Figs. 1 and 2, exerting no spring action.

The spring action is due to placing a tortional strain upon the arms 11—11. Assuming that the bearing holes 9—9, are in thin material, and therefore the bearings are relatively short, and further assuming that the stops 5 and 6 are not used, it will be clear from Fig. 4, that when the arms 11—11 are moved 90° from their dotted position in Fig. 4, to the position shown in full lines, that the ends 13—13 of the fingers 10—10 will follow freely arcs of a circle without any useful work being accomplished, and without placing the arms under tension. If, however, a stop or stops are placed within the arcuate path of the ends 13—13 an entirely different result is accomplished.

In that case when the ends 13—13 are stopped or arrested, from moving freely in their arcuate paths by the stops, further movement of the arms 11—11 from the dotted position in Fig. 4 to the position in full lines, will place a tortional strain upon said arms 11—11, and, for the time being, make them tortional spring arms ready to fly back 90° as soon as the tortional strain is relieved Stops to prevent the free movment of the ends 13—13 of the fingers 10—10 in their arcuate path may be variously formed. A thick nut may be employed so that the fingers 10—10 may assume, entirely within the enlarged hole in the nut, the angular position shown in Fig. 4.

Preferably, however, the nut is made of relatively thin sheet metal, as is the nut in Fig. 4, so that the bearing holes 9—9 are hardly long enough to obtain the best tortional results.

It is for this reason that I press out a portion of the flanges 3 and 4 to form the convex stops 5 and 6. It will be seen, by reference to the enlarged view of Fig. 4, that the ends 13—13 of the fingers 10—10 are prevented from following their arcuate paths, which they would normally follow as they are swung 90°, by these stops 5 and 6. When the ends 13—13 engage the stops 5 and 6 the fingers will also engage the points 15—15 of the bearing hole 9—9. Further movement of the arms 11 from their dotted position in Fig. 4 to the position shown in full lines, will place considerable tortion on the arms making them spring arms which will fly back into the position shown in Figs. 1 and 2, as soon as the restraining influence, as for example the surface of the hole in which they are mounted, is removed, permitting the bolt 2 to be screwed home to support the work, not shown.

Preferably, though not necessarily, I provide stops which, at different positions of the fingers, will vary the amount of tortion imparted to the arms. For example the stops 5 and 6 are preferably inclined or wedge shaped so that the ends 13—13 of the fingers 10—10 will be almost immediately stopped from moving in their arcuate path, thereby immediately storing up tortional strain in the arms 11—11 as they are moved from the dotted position in Fig. 4 to the position shown in full lines in said figure. The ends 13—13 of the fingers 10—10 move down the inclined wedge shaped stops so that a gradual increase of these tortional strains is imparted to the arms 11, which will be less than if the stops were of maximum width through their length. Arranging the stops in this manner insures that sufficient tortion will be imparted to the arms 11 to obtain the desired spring action, and yet not sufficient to reach the elastic limit of the material of which the arms 11—11 are made. Such stops also permit easier rocking of the arms 11—11 in their bearings 9—9.

Having thus described this invention in connection with an illustrative embodiment thereof, to the details of which I do not desire to be limited, what is claimed as new and what is desired to secure by Letters Patent is set forth in the appended claims.

What I claim is:—

1. In a tortional spring toggle the combination of pivoted arms and means to place them under tortion and means to vary the degree of tortion imported in said arms.

2. The combination in a spring toggle of a nut provided with enlarged bearing holes, arms pivotally mounted in said holes, and means to place said arms under tortion when they are rocked in their bearings.

3. The combination in a spring toggle of a nut provided with enlarged bearing holes, each of said holes having a portion of its wall extended to form stops, arms pivotally mounted in said holes and adapted to cooperate with said stops to place them under tortion.

4. A new article of manufacture for toggle bolts comprising a nut provided with enlarged bearing holes to pivotally support arms, each of said holes having a portion of its wall extended to form stops engageable with said arms.

5. A new article of manufacture for toggle bolts comprising a nut provided with enlarged bearing holes to pivotally support arms, each of said holes having a portion of its wall extended to form a tapered stop.

6. The combination in a toggle bolt of a nut provided with enlarged bearings to receive the ends of spring arms, spring arms mounted in said bearings and means to progressively place said arms under tortion when they are rocked in their bearings.

7. In a tortional spring toggle the combination of pivoted arms each having an offset which is adapted to move in an arcuate path, and means to engage the offset to prevent the free movement of the offset in its arcuate path.

8. In a tortional spring toggle the combination of integral spring pivoted arms having offsets which are adapted to move in arcuate paths and means to engage the offsets to prevent the free movement of the offsets in their arcuate paths thereby subjecting the integral spring arms to tortional strains to store up energy which is released when the spring toggle is located in position in a hole in a wall or other support.

JOHN KARITZKY.